(12) United States Patent
Zhou et al.

(10) Patent No.: US 8,204,649 B2
(45) Date of Patent: Jun. 19, 2012

(54) INTEGRATED SYSTEMS AND METHOD FOR PREVENTING MOBILE COMPUTING DEVICE USE WHILE DRIVING

(75) Inventors: Xuesong Zhou, Sandy, UT (US); Wallace M. Curry, Jr., Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 198 days.

(21) Appl. No.: 12/758,637

(22) Filed: Apr. 12, 2010

(65) Prior Publication Data

US 2011/0093161 A1 Apr. 21, 2011

Related U.S. Application Data

(63) Continuation-in-part of application No. PCT/US2009/059732, filed on Oct. 6, 2009, and a continuation-in-part of application No. PCT/US2009/062788, filed on Oct. 30, 2009.

(60) Provisional application No. 61/168,530, filed on Apr. 10, 2009, provisional application No. 61/104,171, filed on Oct. 9, 2008, provisional application No. 61/110,340, filed on Oct. 31, 2008.

(51) Int. Cl.
*G06F 7/00* (2006.01)
(52) U.S. Cl. ........................................................ 701/36
(58) Field of Classification Search ................. 701/29.1, 701/31.5, 36
See application file for complete search history.

(56) References Cited

U.S. PATENT DOCUMENTS

| 5,631,947 | A  | 5/1997  | Wittstein et al.  |
|-----------|----|---------|-------------------|
| 5,642,402 | A  | 6/1997  | Vilmi et al.      |
| 5,664,012 | A  | 9/1997  | Chen              |
| 5,835,022 | A  | 11/1998 | Amano             |
| 6,011,973 | A  | 1/2000  | Valentine et al.  |
| 6,075,999 | A  | 6/2000  | Vilmi et al.      |
| 6,188,315 | B1 | 2/2001  | Herbert et al.    |
| 6,233,448 | B1 | 5/2001  | Alperovich et al. |
| 6,233,468 | B1 | 5/2001  | Chen              |
| 6,314,179 | B1 | 11/2001 | Chen              |
| 6,349,223 | B1 | 2/2002  | Chen              |

(Continued)

FOREIGN PATENT DOCUMENTS

JP 2004/179973 6/2004

(Continued)

OTHER PUBLICATIONS

PCT Application PCT/US2010/055872; filed Nov. 8, 2010; Xuesong Zhou; International Search Report mailed Jul. 1, 2011.

(Continued)

*Primary Examiner* — Kim T Nguyen
(74) *Attorney, Agent, or Firm* — Thorpe North & Western LLP (57) ABSTRACT

A system and method for controlling use of a mobile computing device in a vehicle are disclosed. The method comprises monitoring a vehicle-key system comprising a vehicle and a vehicle key having a particular code to determine when the vehicle has been activated using the vehicle key. An operational state of the vehicle is identified based on information received from an OBD port in the vehicle. The operational state of the vehicle is communicated to the mobile computing device. Use of selected device features on the mobile computing device are controlled based on the particular code of the vehicle key when the operational state of the vehicle indicates that the vehicle is outside of selected parameters.

20 Claims, 6 Drawing Sheets

U.S. PATENT DOCUMENTS

| | | |
|---|---|---|
| 6,353,778 B1 | 3/2002 | Brown |
| 6,393,301 B1 | 5/2002 | Oda |
| 6,453,180 B1 | 9/2002 | Endoh et al. |
| 6,600,975 B2 | 7/2003 | Moriguchi et al. |
| 6,690,940 B1 | 2/2004 | Brown et al. |
| 6,711,480 B2 | 3/2004 | Yamamoto et al. |
| 6,731,925 B2 | 5/2004 | Naboulsi |
| 6,771,946 B1 | 8/2004 | Oyaski |
| 6,968,311 B2 | 11/2005 | Knockeart et al. |
| 6,973,333 B1 | 12/2005 | O'Neil |
| 7,006,793 B2 | 2/2006 | Himmel et al. |
| 7,009,488 B2 | 3/2006 | Schwartz |
| 7,024,176 B2 | 4/2006 | Shimizu et al. |
| 7,181,229 B2 | 2/2007 | Singh et al. |
| 7,218,213 B2 | 5/2007 | Katagiri et al. |
| 7,260,390 B1 | 8/2007 | Skinner et al. |
| 7,302,272 B2 | 11/2007 | Ackley |
| 7,437,168 B1 | 10/2008 | Westfield |
| 7,477,135 B2 | 1/2009 | Belcher et al. |
| 7,551,930 B2 | 6/2009 | Lempio et al. |
| 2003/0003892 A1 | 1/2003 | Makinen |
| 2003/0096593 A1 | 5/2003 | Naboulsi |
| 2003/0231550 A1 | 12/2003 | Macfarlane |
| 2004/0209594 A1 | 10/2004 | Naboulsi |
| 2005/0255874 A1 | 11/2005 | Stewart-Baxter et al. |
| 2006/0148490 A1 | 7/2006 | Bates et al. |
| 2007/0041552 A1 | 2/2007 | Moscato |
| 2007/0072553 A1 | 3/2007 | Barbera |
| 2007/0072616 A1 | 3/2007 | Irani |
| 2007/0086579 A1 * | 4/2007 | Lorello et al. .......... 379/45 |
| 2007/0222291 A1 | 9/2007 | Shimomura |
| 2008/0014869 A1 | 1/2008 | Demirbasa et al. |
| 2008/0014966 A1 | 1/2008 | Chakraborty et al. |
| 2008/0045234 A1 | 2/2008 | Reed |
| 2008/0064446 A1 | 3/2008 | Camp et al. |
| 2008/0129475 A1 | 6/2008 | Breed et al. |
| 2008/0220715 A1 | 9/2008 | Sinha et al. |
| 2008/0268768 A1 | 10/2008 | Brown et al. |
| 2008/0305735 A1 | 12/2008 | Farnsworth |
| 2009/0029675 A1 | 1/2009 | Steinmetz |
| 2009/0051510 A1 | 2/2009 | Follmer |
| 2009/0117919 A1 | 5/2009 | Hershenson |
| 2010/0210254 A1 | 8/2010 | Kelly et al. |
| 2010/0233959 A1 | 9/2010 | Kelly et al. |
| 2011/0009107 A1 | 1/2011 | Guba et al. |
| 2011/0021234 A1 | 1/2011 | Tibbitts et al. |

FOREIGN PATENT DOCUMENTS

| | | |
|---|---|---|
| KR | 10-0742112 | 7/2007 |
| KR | 10-0796714 | 1/2008 |
| KR | 10-2009-0096051 | 9/2009 |
| WO | WO 03/028342 | 4/2003 |
| WO | WO 03/036805 | 5/2003 |
| WO | WO 2004/019646 | 3/2004 |
| WO | WO 2006/070168 | 7/2006 |
| WO | WO 2007/016641 | 2/2007 |
| WO | WO 2007/040777 | 4/2007 |
| WO | WO 2008/059727 | 5/2008 |
| WO | WO 2010/042542 | 4/2010 |
| WO | WO 2010/051455 | 5/2010 |
| WO | WO 2010/129939 | 11/2010 |
| WO | WO 2011/011544 | 1/2011 |

OTHER PUBLICATIONS

PCT Application PCT/US2009/059732; filed Oct. 6, 2009; Wallace Curry; ISR mailed May 28, 2010.

PCT Application PCT/US2009/062788; filed Oct. 30, 2009; Xuesong Zhou; ISR mailed Jun. 18, 2010.

Barreras et al.; Convenient or Invasive: The Information Age; May 2007; 11 pages, chpt 18; Ethica Publishing.

Borzo; Eyes on the Road; CNNMoney; http//money.cnn.com/magazines/business2/business2_archive/2006/01//8394982/index...; Mar. 15, 2007.

Cabrero; New Device Aims to Make Teens Safer Drivers; KSL.com; http://www.ksl.com/?nid=148&sid=8876787; Dec. 1, 2009; 2 pages.

Drivcam, the Driver Science Company; http://www.drivecam.com/; as accessed on Jul. 28, 2008; 2 pages.

Getisight, Real-Time Mobile Tracking, Where your teenagers are NOW?; http://getsight.com; as accessed on Jul. 28, 2008; 1 page.

GPS Teen Tracking, Monitor Your Teenagers Driving Habits Online; http://www.gpsteentracking.com/?gclid=CM-5oezw74QCFRZZiAodfHU5RA as accessed on Jul. 28, 2008; 2 pages.

Guardiangel; http://www.guardiangeltech.com/Cell_Phone_for_Teenagers.html; as accessed on Jul. 28, 2008; 2 pages.

How IT Works: Snapshot Discount, Usage-Based Insurance—Progressive; as accessed on Apr. 6, 2011; 2 pages.

Rocky Mountain Tracking, Inc., GPS Tracking; The Single Source for all your GPS Tracking Needs; http://www.rmtracking.com/teentracking.php; as accessed on Jul. 28, 2008; 4 pages.

SmoothTalker High Performance Cellular Antenna Connection Cables; https://www.smoothtalker.com/products/cellular-antennas/afntenna-connection-cables/; as accessed on Sep. 29, 2009; 2 pages.

Technology Demonstrations, Experience VII and Other Vehicle Technologies Right on the Streets of New York; 15$^{th}$ World Gongress on ITS, Nov. 16-20, 2008, Jacob K. Javits Convention Center, New York City, NY; http://itswc2008.ntpshowsites.com/technology-demonstrations.html; 1 page.

TTFF Comparisons; PocketGPSWorld.com; http://pocketgpsworld.com/ttffcomparisons.php; May 4, 2003; 3 pages.

Applikompt™, applied Computer Technologies™, Inc.; http://actplace.net/InvestorsPamphlet.htm; as accessed on Oct. 9, 2009; 3 pages.

Applikompt™, Applied Computer Technologies™, Inc.; http://actplace.net/Press%20Releas.htm; as accessed on Oct. 9, 2009; 3 pages.

Related Case: U.S. Appl. No. 13/127,186, filed May 2, 2011; Zuesong Zhou.

Related Case: U.S. Appl. No. 13/123,490, filed Apr. 8, 2011; Wallace Curry.

* cited by examiner

INTEGRATED SYSTEMS AND METHOD FOR PREVENTING MOBILE COMPUTING DEVICE USE WHILE DRIVING

RELATED APPLICATIONS

This application claims the benefit of U.S. Provisional patent application Ser. No. 61/168,530 filed on Apr. 10, 2009, which is incorporated herein by reference. Priority is also claimed to PCT patent application PCT/US09/59732 filed on Oct. 6, 2009 which claims priority to U.S. Provisional patent application Ser. No. 61/104,171 filed on Oct. 9, 2008, both of which are incorporated herein by reference. Priority is also claimed to PCT patent application PCT/US09/62788 filed on Oct. 30, 2009 which claims priority to U.S. Provisional patent application Ser. No. 61/110,340 filed on Oct. 31, 2008, both of which are incorporated herein by reference.

BACKGROUND

In 2007, statistics show that about 84% of the US population subscribed to a form of wireless mobile phone service. Approximately 6% of automobile drivers admitted to using hand-held phones while driving. The actual number of drivers using wireless devices is likely much greater. Researchers have shown that using mobile phones while driving is four times as likely to get into crashes, and the increased crash risk is similar for hands-free and hand-held phones.

The U.S. Department of Transportation has launched numerous programs and initiatives to reduce traffic-related fatalities and injuries. Many states explicitly prohibit talking, text-messaging or playing video games on hand-held mobile phones while driving. Additionally, a number of states, such as California, have passed laws banning or restricting young drivers (under age 18) from using mobile phones, or other types of mobile devices while driving. However, a recent study in North Carolina finds that teenagers seem to ignore such restrictions. A ban on the use of wireless devices by teenagers while driving was enacted in the Spring of 2007. The study found that approximately 11% of teenage drivers observed departing 25 high schools were using mobile phones during the two months before the restrictions were enacted, while about 12% of teenage drivers were observed using mobile phones during the five months after the enactment of the restrictions.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "mobile computing device" is used throughout the specification. The term is intended to include cell phones, gaming devices, laptop computers, tablet computers, and other types of portable computing devices that may be used in a vehicle.

EXAMPLE EMBODIMENTS

Detecting when a user is driving an automobile has proved a great challenge. Various attempts have been made to detect movement of the cell phone or computing device using inertial navigation systems and geolocation devices. However, such detection can be complex, expensive, and fairly inaccurate.

Certain attempts have also been made to use proprietary hardware that connects to certain locations within an automobile, such as hard wiring a detector to the automobile's ignition to tell when it has been turned on. However, this requires professional installation of proprietary hardware and in some cases can void a car's warranty.

To overcome these limitations, one embodiment of the present invention provides a system and method for controlling the use of cell phones and mobile computing devices while the user is driving an automobile by using information from the automobile's on-board-diagnostic system.

On-Board Diagnostics, or OBD, in an automotive context, is a generic term referring to a vehicle's self-diagnostic and reporting capability. OBD systems give the vehicle owner or a repair technician access to state of health information for various vehicle sub-systems. The amount of diagnostic information available via OBD has varied widely since the introduction in the early 1980s of on-board vehicle computers, which made OBD possible. Early instances of OBD would simply illuminate a malfunction indicator light, or MIL, if a problem was detected—but would not provide any information as to the nature of the problem. Modern OBD implementations use a standardized fast digital communications port to provide near real-time data in addition to a standardized series of diagnostic trouble codes, or DTCs, which allow one to rapidly identify and remedy malfunctions within the vehicle. OBD systems are required by the Environmental Protection Agency (EPA) to be installed on all light-duty vehicles and trucks, as well as heavy-duty engines.

Figure 1:
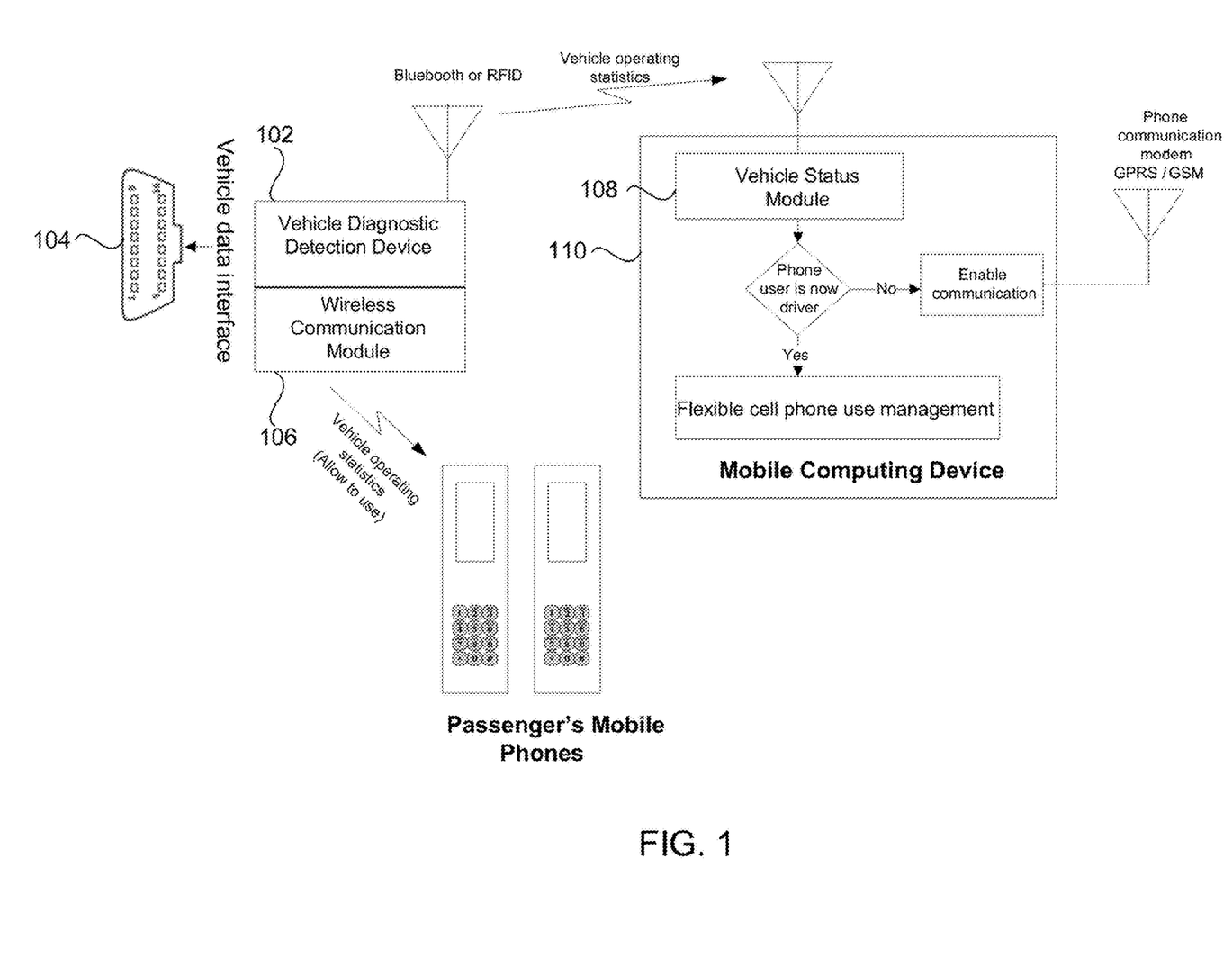
FIG. 1 is a block diagram of a system for controlling wireless communication in a vehicle in accordance with an embodiment of the present invention.

In one embodiment, a system for controlling wireless communication in a vehicle is disclosed, as illustrated in FIG. 1. The system includes a vehicle diagnostic detection device 102 having a connector configured to connect to an on-board-diagnostic (OBD) port 104 in the vehicle. A wireless communication module 106 configured to transmit selected information from the automobile diagnostic detection device can be coupled to the vehicle diagnostic detection device. The wireless communication module may be integrated with the device to form a single device. Alternatively, the wireless communication module may be a separate module that is electrically connectable to the vehicle diagnostic detection device.

The system further comprises a vehicle status module 108 configured to operate on a mobile computing device 110. The vehicle status module may be comprised of software, firmware, hardware, or some combination of these. In one embodiment, the vehicle status module is software that can be installed on the mobile computing device. The module enables the mobile computing device to receive and interpret the selected information transmitted by the wireless communication module. The vehicle status module can interpret the selected information and can limit the functionality of the mobile computing device when the selected information communicates that the vehicle is operating outside of selected criteria.

For example, in one embodiment the vehicle diagnostic detection device 102 can detect an on/off state of the vehicle's engine through the OBD connection 104. When the vehicle is turned on, this information can be communicated from the OBD connection to the vehicle diagnostic detection device. The information from the vehicle diagnostic detection device can then be transmitted to the mobile computing device 110 and processed by the vehicle status module 108 operating on the mobile computing device 110. In response to the information, the vehicle status module can limit the functionality of the mobile computing device.

Other types of information from the vehicle OBD connection 104 can also be used to monitor the status of the vehicle. For example, the vehicle speed, acceleration, and engine operating statistics including the engine's revolutions per minute (RPM) can be accessed using the OBD. This information can be used to obtain additional information that may be useful in allowing a user to have additional access to the user's mobile computing device based on the information obtained from the vehicle OBD connection.

If a passenger's phone has not been paired previously with the OBD, then the device function is not affected. The flexible cell phone use management module can determine the priority of multiple cell phones wirelessly connected to the same OBD. In one example of priority rules, when the first phone connects, the first is pre-assumed as the driver, and this cell phone user can switch driver mode to passenger mode if parents' permission code or message is given. Other priority rules can be setup according to time of day and vehicle location.

In one embodiment, it may be advantageous to allow a user to use their mobile computing device 110 when the vehicle is at a stop or travelling at a relatively slow speed. The vehicle status module 108 can be configured to allow outbound and incoming calls to be placed when the car is operating at less than a selected velocity, such as less than 10 miles per hour (MPH).

Alternatively, more user intensive operations such as texting and gaming may not be allowed until the vehicle has come to a complete stop and been put in park, as determined by the information obtained through the connection 104 with the OBD that is transmitted from the diagnostic detection device 102 to the mobile computing device 110.

The vehicle status module 108 can be configured to disable use of any function of the mobile computing device 110 that can reduce the attention of a vehicle driver. This may include email, texting, gaming, received phone calls, transmitted phone calls, etc. Once the vehicle has slowed or stopped, free operation of selected applications on the mobile computing device can be returned to normal operation. When the vehicle is turned off, all applications that are disabled by the vehicle status module can be returned to standard functioning.

The vehicle diagnostic detection device 102 can communicate wirelessly with the mobile computing device 110 using a low power wireless communication standard. For example, the wireless communication may be performed using a Bluetooth standard, an IEEE 802.11 standard, an IEEE 802.15 standard such as ZigBee, Near Field Communications (NFC) such as the ISO/IEC 14443 standard, and so forth. In one embodiment, the vehicle diagnostic detection device can be powered through the vehicle data interface 104 with the OBD port. Alternatively, power can be obtained from a standard 12 volt connection with the vehicle. The ability to power the vehicle diagnostic detection device using a standard power source in the vehicle eliminates the need for repeated battery changing or battery charging. This enables the device to function continuously without the need for frequent attention from the vehicle owner.

The vehicle status module 108 can be installed to operate on the mobile computing device 110. The mobile computing device may need to be registered with the vehicle diagnostic detection device, depending upon the type of wireless connection used between the mobile computing device and the vehicle diagnostic detection device 102. For example, a Bluetooth standard connection may be preferable due to the prevalence of integrated Bluetooth in mobile computing devices such as wireless phones. A user can pair his or her mobile computing device with the vehicle diagnostic detection device to cryptographically authenticate the identity of the device. Paring can enable the devices to communicate any time they are within range, such as when a driver enters the vehicle.

In one embodiment, the vehicle status module 108 can include safety protocols that make it difficult to disable the wireless link between the mobile computing device 110 and the vehicle diagnostic detection device 102. For example, when a young driver is given their first car to drive, a parent or guardian can supervise the installation of the vehicle diagnostic detection device into the vehicle the youth will drive. The vehicle status module can be installed on the youth's mobile computing device and the computing device can be paired with the vehicle diagnostic detection device. If the pairing is turned off, thereby disabling the connection between the devices, the vehicle status module can be configured to transmit a text to a predetermined phone number, such as the parents or guardians, notifying that the paring has been turned off. In addition, the vehicle status module can be configured to transmit the vehicle's odometer reading each time the vehicle is turned on and off, thereby enabling a person monitoring the transmitted data to determine if the vehicle had been operated without the use of the vehicle status module operating on the mobile computing device. Alternatively, the vehicle diagnostic detection device can be configured to record the odometer readings and transmit a warning message if the vehicle odometer reading is not substantially the same when the vehicle is turned on as it was when it was last recorded, thereby showing that the vehicle was operated without the vehicle diagnostic detection device turned on.

In one embodiment, the vehicle status module can include safety protocols that make it difficult to disable the wireless link between the mobile computing device and the vehicle key. For example, when a young driver is given their first car to drive, a parent or guardian can ensure the software monitoring module is installed on the youth's mobile computing device and the computing device can be paired with the vehicle key. If the pairing is turned off, thereby disabling the connection between the devices, the software monitoring module can be configured to transmit a text to a predetermined phone number, such as the parents or guardians, notifying that the paring has been turned off. In addition, the vehicle key module can be equipped with a data memory to record the wireless connection communication status each time the vehicle is turned on and off, thereby enabling a person monitoring the transmitted data to determine if the vehicle had been operated without the wireless communication link.

In one embodiment, the software monitoring module on the computing device can be configured to transmit a warning message if the wireless link has been connected for a certain extended period of time (e.g. one week). In another embodiment, the software monitoring module on the computing device can be configured to transmit a warning message if a user attempts to uninstall the software package. In addition, the parents can provide a rough estimate of monthly driving time for their children. If the paired key is not used or not working properly, then there is no sufficient and normal driving time logged in the software monitoring system. In this case, a warning message will be sent to the parents allowing them to correct the problem. The above connection checking rules are designed to detect the following potential problems: leaving the key exposed all the time to kill the battery to avoid the whole process; switching cell phone with a friend; and making a copy of parents' key.

Multiple different persons may operate the same vehicle at different times. For example, multiple teenagers, a mother, and a father may drive the family car. Each of the persons may have a mobile computing device 110 configured to operate the vehicle status module 108 and communicate with the vehicle diagnostic detection device 102 through the wireless communication module 106. It can be inconvenient for passengers travelling in a car to have the functionality of their mobile computing devices limited.

To enable the functionality of the driver's mobile computing device to be limited, while allowing passenger's full access to their mobile computing devices, a link between the driver and his or her mobile computing device can be formed. One such link that can be formed is a link between the driver's personal vehicle key and the driver's mobile computing device. When the driver's personal vehicle key is in use, then the functionality of the driver's mobile computing device can be limited, based on the output of the OBD, as previously discussed.

In accordance with one embodiment, a vehicle-key system and mobile phone can be configured to communicate through a communication means, such as Bluetooth, Radio-frequency identification (RFID) or a data cable to enable the mobile phone to be associated with the vehicle-key system.

In one embodiment, an embedded transmitter can be coupled to a traditional automobile key. The embedded transmitter can include a button switch or a starter button. In one embodiment, actuation of the button may release the key, enabling the key to be used to activate the automobile, such as starting the vehicle engine or allowing the electric motor(s) to be used.

When the button is actuated, the embedded transmitter in the vehicle-key system can be wirelessly connected to a nearby mobile phone that is located within a relatively short range of the vehicle-key system. The wireless link can be a short range wireless communication protocol, such as Bluetooth or RFID. Such a short range wireless protocol can be used to limit the amount of battery power needed to communicate between the vehicle-key system and the mobile phone.

After the key system is used to turn off the vehicle engine, the wireless transmitter can automatically disconnect the wireless communication link with the associated mobile phone, if the connection has been established previously when the key is used to start the engine.

An enhanced key system for a vehicle using a traditional physical key can comprise the traditional key, a wireless communication transmitter coupled to the key that is configured to communicate between the key and the mobile phone, and a receiver coupled to the automobile to communicate between the key, and in some embodiments, with the mobile computing device. For a vehicle having a remote keyless system, instead of having a traditional mechanical key, a wireless key fob transceiver is configured to send a security code to a receiver in the vehicle. The wireless key fob transceiver can be configured to send a signal, such as the security code, to the mobile computing device as well.

Communication between the key, mobile computing device, and vehicle can be accomplished using a low power, short range communication means, such as Bluetooth, Zigbee, or through the use of Radio-Frequency Identification (RFID) chips or other types of radio frequency or magnetic induction communication chips embedded in the vehicle key and/or mobile computing device. The mobile computing device can include a digital telephonic communication system that can communicate with a telephone system using a radio frequency connection. The device may communicate using a standard connection such as GSM/GPRS, or another standard used for mobile phone transmission.

Enabling a person's unique vehicle key to communicate with the person's mobile computing device, such as mobile phone, facilitates controlling use of the person's mobile computing device while the person is driving, while allowing use of the person's mobile computing device in a moving vehicle when the person is not driving. Use of the computing device is not blocked based on delayed or inaccurate GPS data or unreliable mode recognition results which can lead to incorrect disruption of cell phone services that lead to unpleasant user experiences.

Figure 2A:
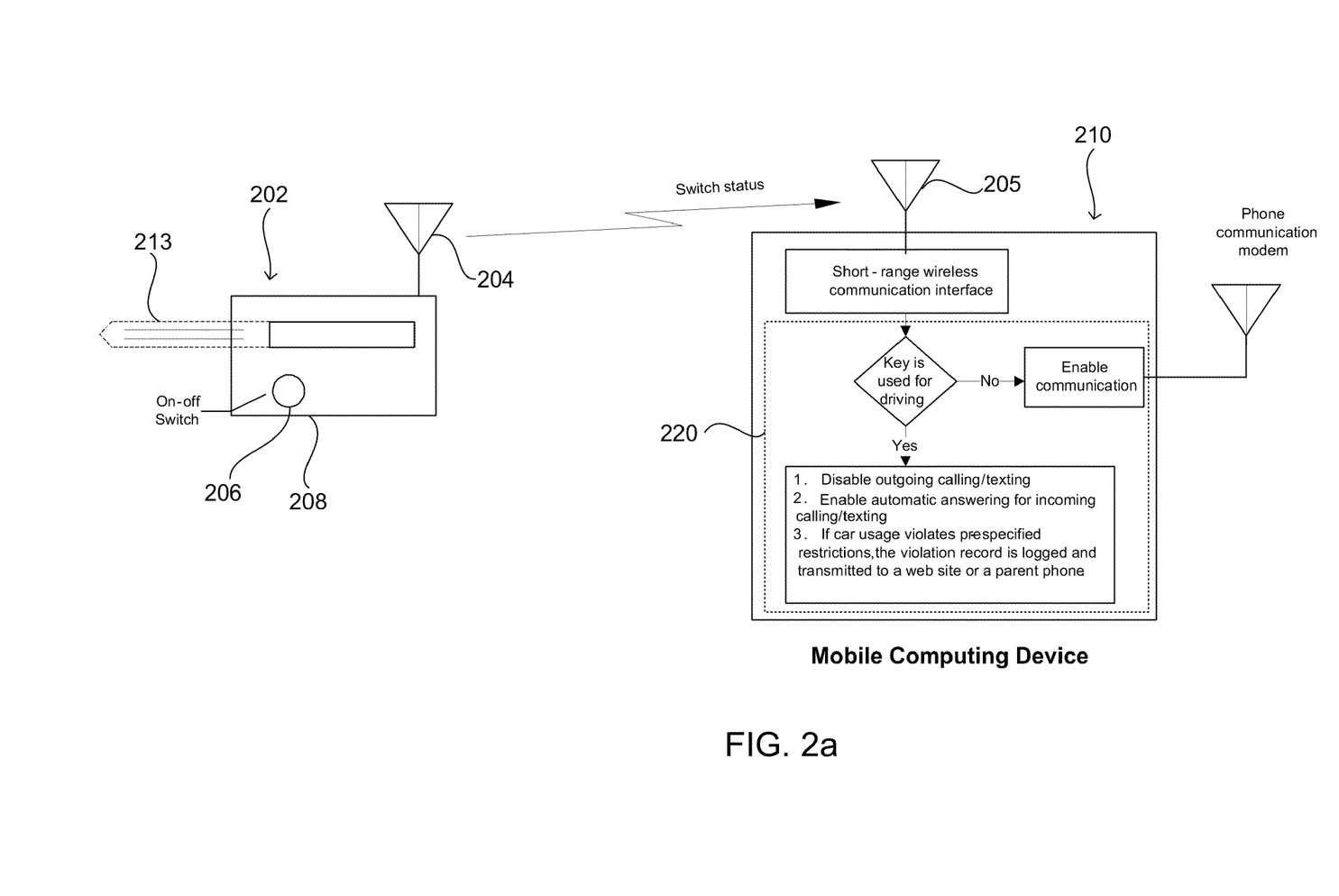
FIG. 2a is a block diagram of a system for determining when a specific vehicle key is used to activate a vehicle in accordance with an embodiment of the present invention.

In one embodiment, a system for determining when a specific vehicle key is used to activate a vehicle is disclosed. The determination is made, in part, based on a signal transmitted between a vehicle key transceiver 204 and a mobile computing device transceiver 205. The vehicle key 202 can include a wireless transceiver 204 and an on-off button 206, as illustrated in FIG. 2a. In the key illustrated in FIG. 2a, the on-off button may be a mechanical button used to initiate the ejection of a mechanical key 213 from the key body 208 to enable the mechanical key to be inserted into the vehicle. When the mechanical key is ejected from the key body 208, a short range radio frequency signal can be sent from the wireless transceiver 204 to the transceiver 205 on the mobile computing device 210. The signal can indicate that the mechanical key 213 has been placed in a position to be inserted into the vehicle to make the vehicle operational. When the key is in this position, the signal sent to the mobile computing device transceiver 205 can be used to place the mobile computing device 210 in a selected mode, such as a driving mode, which can limit the functions and capabilities of the mobile computing device 210. A software monitoring module 220 can be installed on the mobile computing device to provide the functionality needed to interpret the signal sent from the vehicle key 202, or the vehicle, that indicates that the vehicle key is being used to activate the vehicle. The software monitoring module 220 can also be used to control the functionality of the mobile computing device 210. In one embodiment, the software monitoring module 220 can be incorporated in the vehicle status module 108 (FIG. 1).

For example, outbound wireless communication from the mobile computing device 210 can be disabled or restricted when the key 213 has been activated. The restriction can include limitations on outgoing phone calls, outgoing voice messaging, text messaging, gaming, emailing, calendaring, and mobile device display. Other limitations on functionality of the mobile computing device can be restricted based on the output of the OBD, as previously discussed. Optionally, restrictions can be tailored (increased or decreased) depending on whether a hands-free device is being used and assessment of a user or responsible party (e.g. parent, insurer, etc.) as to risk level associated with hands-free usage.

Figure 2B:
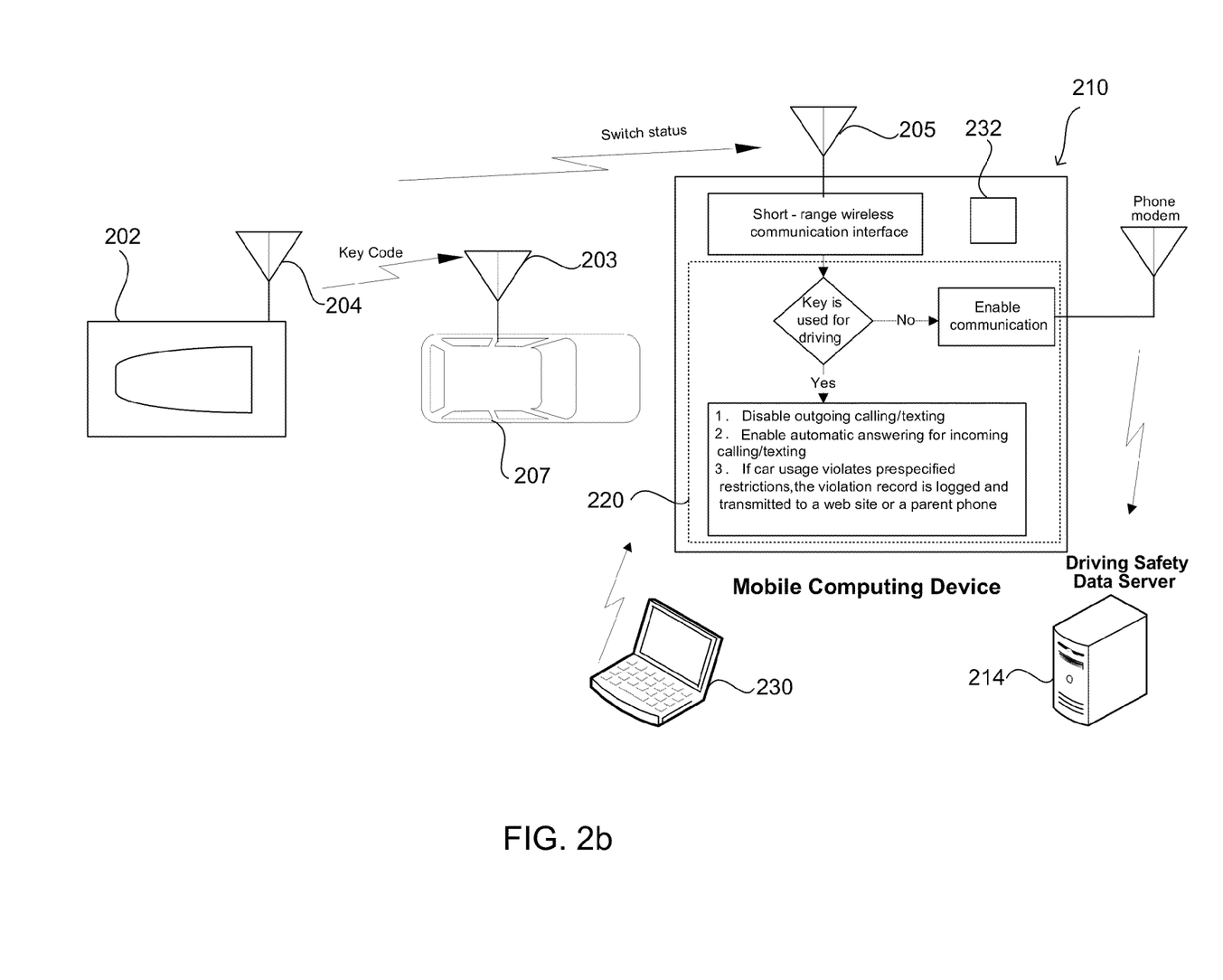
FIG. 2b is a block diagram of a system for determining when a specific vehicle key is used to activate a vehicle having a wireless key system in accordance with an embodiment of the present invention.

In another embodiment illustrated in FIG. 2b, a vehicle transceiver 203 and the vehicle key transceiver 204 may communicate wirelessly. No mechanical connection may actually be used between the key 202 and the vehicle 207 in order to make the vehicle operational. In this case, a specific code can be communicated to the vehicle transceiver 203 from the vehicle key transceiver 204. This code can be sent to enable the vehicle to become operational. When the vehicle key containing an appropriate code is present within the vehicle, or within a predetermined distance of the vehicle, the vehicle can be activated. For example, the activation of the vehicle can include starting the vehicle by depressing a "start button" on the vehicle. When the start button is depressed, the vehicle transceiver 203 can send a query to the key transceiver 204. The key transceiver can send a response signal to the query by sending the specific code to the vehicle transceiver 203 to allow the vehicle 207 to be activated. The vehicle can stay in continuous communication with the key. If the engine is turned off, and the vehicle key 202 is only used to activate the vehicle's power, such as listening to the radio in the vehicle without the engine running, a link between the mobile computing device 210 and the vehicle transceiver 203 or key transceiver 204 can be severed to preserve battery power. Alternatively, the vehicle may ping the key. Pinging can consist of sending a message to the key to ask for its code at a predetermined frequency, such as once per second.

The signal sent from the key transceiver 204 to the vehicle transceiver 203 can also be received by the mobile computing device transceiver 205. When the signal is received at the mobile computing device 210, the functionality of the mobile computing device can be controlled, as previously discussed.

In another embodiment, the vehicle key transceiver 204 can communicate with the vehicle transceiver 203. The vehicle transceiver 203 can then be used to communicate directly with the mobile computing device transceiver 205. By using the vehicle 207 to communicate with the mobile computing device 210, the amount of energy output from the vehicle key 202 can be minimized, thereby extending the vehicle key battery life. Moreover, additional information may be communicated from the vehicle 207 to the mobile computing device 210.

Rather than merely identifying whether the vehicle 207 is in an on or off state, additional information such as vehicle speed, time of day, and vehicle location can be communicated from the vehicle diagnostic detection device 102 (FIG. 1) to the mobile computing device 210.

The limitations can also be adjusted based on other conditions such as the time of day, the location, or the type of driver. For example, when a mobile phone is used by a new teenage driver, an aging parent, or an employer seeking to minimize liability, outgoing communications from the mobile computing device 210 may be turned off whenever the vehicle 207 is moving to encourage the driver to devote maximum attention to operating the vehicle. The limitations may be extended for a certain period of time, such as 30 seconds, even after a vehicle has stopped to discourage outgoing calls and texting during stop and go traffic.

In one embodiment, at least one of the vehicle 207, vehicle key 202, and the mobile computing device 210 can include safety protocols that make it difficult to disable the wireless link between the mobile computing device and the vehicle key or the link between the vehicle and the mobile computing device. For example, when a young driver is given their first car to drive, a parent or guardian can ensure the software monitoring module 220 is installed on the youth's mobile computing device 210 and the mobile computing device can be paired with the youth's vehicle key. If the pairing is turned off, thereby disabling the connection between the devices, the software monitoring module can be configured to transmit information, such as a text, to a predetermined location, such as to a parent, guardian, or employer notifying them that the paring has been turned off. In addition, the vehicle key module 202 can be equipped with a data memory to record the wireless connection communication status each time the vehicle is turned on and off, thereby enabling a person monitoring the transmitted data to determine if the vehicle had been operated without the wireless communication link.

In one embodiment, the software monitoring module 220 in the mobile computing device 210 can be in communication with a built-in accelerometer 232 to detect the motion status of the mobile computing device and accordingly turn on and off a wireless connection link with the vehicle key 202 or the vehicle 207. For example, when the mobile computing device remains substantially immobile for a long time, e.g. 10 min, the mobile computing device can automatically turn off a Bluetooth communication channel to save battery usage. When a predetermined amount of acceleration is sensed by the accelerometer, the wireless communication can be resumed and the link can be reestablished. By doing so, a mobile computing device with the monitoring software module 220 installed can use less battery power, thereby enabling the battery to be recharged less frequently.

In one embodiment, rather than strictly enforcing usage rules by limiting the functionality of the wireless computing device 210, device usage may be stored within the device. The usage information can be sent through a wireless connection from the wireless computing device to a remote data server 214 configured to monitor usage information, as shown in FIG. 2b. Car usage restrictions, such as permissible schedules and locations, can be input to the mobile phone. If the received signal shows the vehicle key is used to operate the vehicle and the previously entered car usage restriction violates the pre-specified restrictions, the violation record can be logged and transmitted to the remote data server or a parent or supervisor mobile phone. The driving data and safety violation data can be further used in a usage based insurance system which adjusts insurance rates and/or discounts based on collected data. In one embodiment, the information may only be sent if pre-specified restrictions are violated, such as phone use above a predetermined limit. For example, if a driver is using his or her mobile phone while driving faster than 25 miles per hour, the information may be sent to an external source, as previously discussed.

Figure 3:
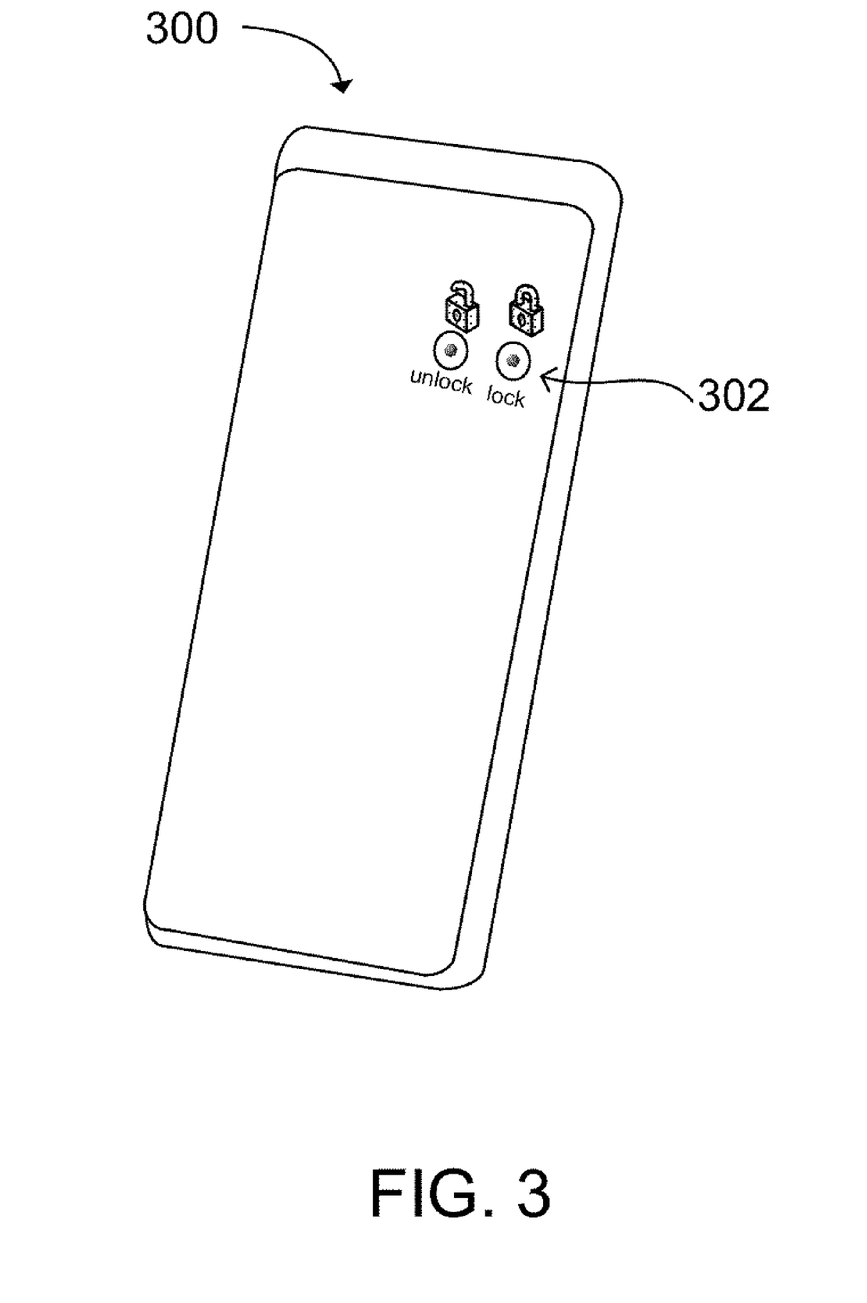
FIG. 3 is an exemplary illustration of a mobile computing device having an integrated key code.

In another embodiment, an electronic vehicle key can be incorporated directly in a mobile computing device, thereby reducing the number of electronic devices a user needs to carry. For example, in 2004, the Nokia Mobile RFID Kit was combined with the Nokia 5140 mobile phone to form the first GSM phone integrated product offering with RFID reading capability. RFID technology has been used in many urban mass-transit systems for passengers to make electronic payments. In another example, as illustrated in FIG. 3, a wireless phone network provider NTT DoCoMo and electronics maker Sharp have developed a prototype mobile phone 300 that doubles as an intelligent ignition key for automobiles. The system provides an integrated intelligent key that uses two-way wireless communications capable of triggering the doors or engine of a vehicle without requiring a separate key. In this example, the mobile phone can be in direct communication with the vehicle. A user can lock and unlock doors using buttons 302 located on a face of the phone 300. The phone can communicate an electronic ID that enables the vehicle to start, as previously described. The vehicle can transmit signals to the integrated phone-key system. When the vehicle is activated, various limitations can be applied to the mobile phone 300, as previously discussed.

In one embodiment, the specific key code transmitted by a key can be associated with a particular user. For example, a vehicle owner can have multiple keys, one for a child, and keys for each parent. In a commercial setting, each employee can be assigned his or her own key. Each key can have a unique key code, thereby identifying the driver using the key. Different restrictions may be applicable to the different users of the vehicle. When a user is not driving the vehicle, his or her mobile computing device will still be operable since there won't be a link between their key, the vehicle, and/or their mobile computing device. This information can be used in conjunction with information from the OBD to provide a system that can limit the functionality of the driver's mobile computing device based on desired vehicle status indicators, while allowing passengers in the vehicle to continue to use their mobile computing device.

Figure 4:
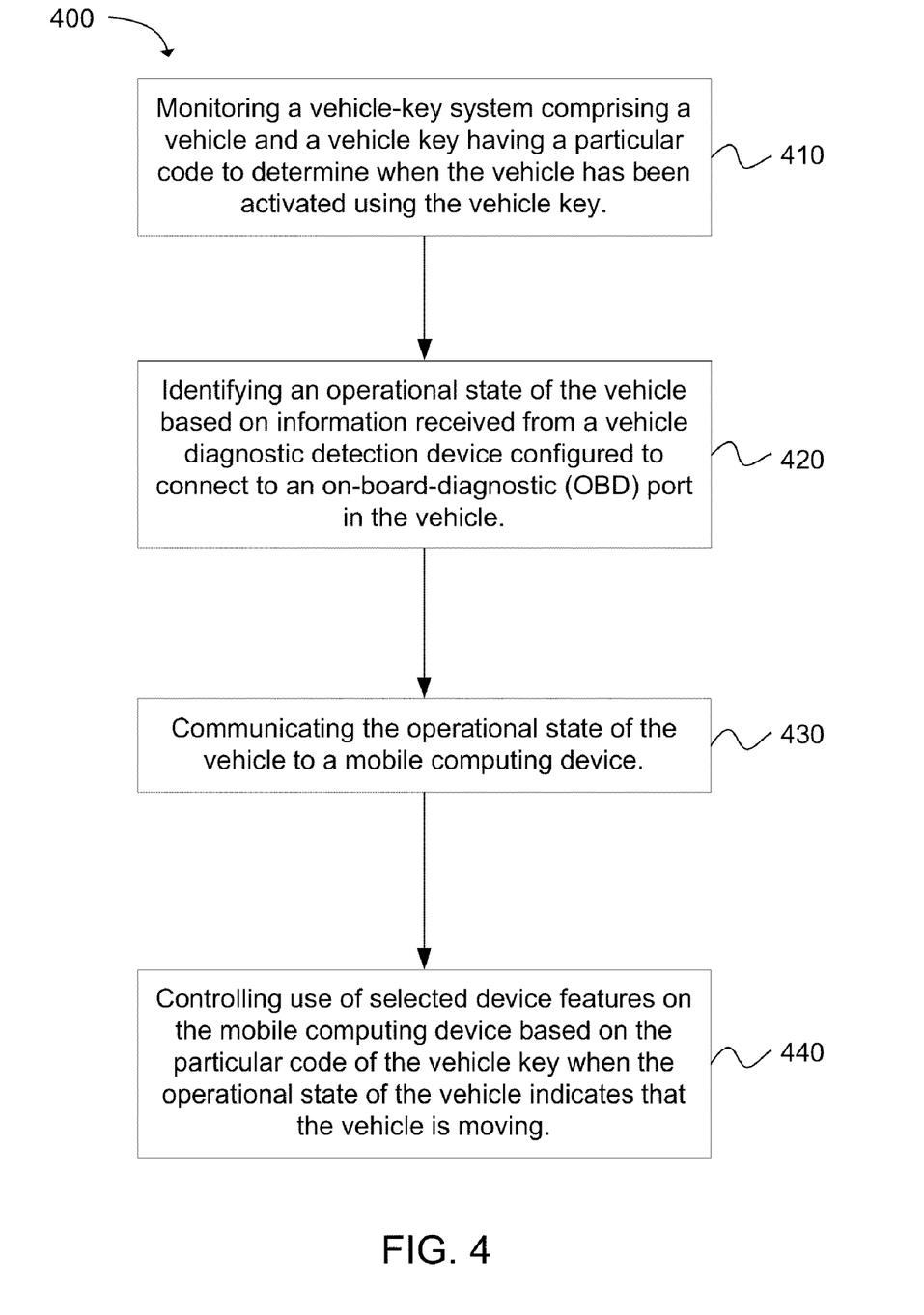
FIG. 4 is a flow chart depicting a method for controlling wireless communication in a vehicle in accordance with an embodiment of the present invention.

FIG. 4 provides a flow chart depicting a method for controlling use of a mobile computing device in a vehicle. The method comprises monitoring 410 a vehicle-key system comprising a vehicle and a vehicle key having a particular code to determine when the vehicle has been activated using the vehicle key. An operational state of the vehicle is identified 420 based on information received from a vehicle diagnostic detection device configured to connect to an on-board-diagnostic (OBD) port in the vehicle. The operational state of the vehicle is communicated 430 to the mobile computing device. The use of selected device features on the mobile computing device are controlled 440 based on the particular code of the vehicle key when the operational state of the vehicle is outside of selected parameters. These parameters can include vehicle speed, vehicle location, time of day, and so forth. For example, in one embodiment, when the vehicle is travelling faster than a set speed, such as 10 MPH, then the operational state of the vehicle is considered to be outside of selected parameters.

Figure 5:
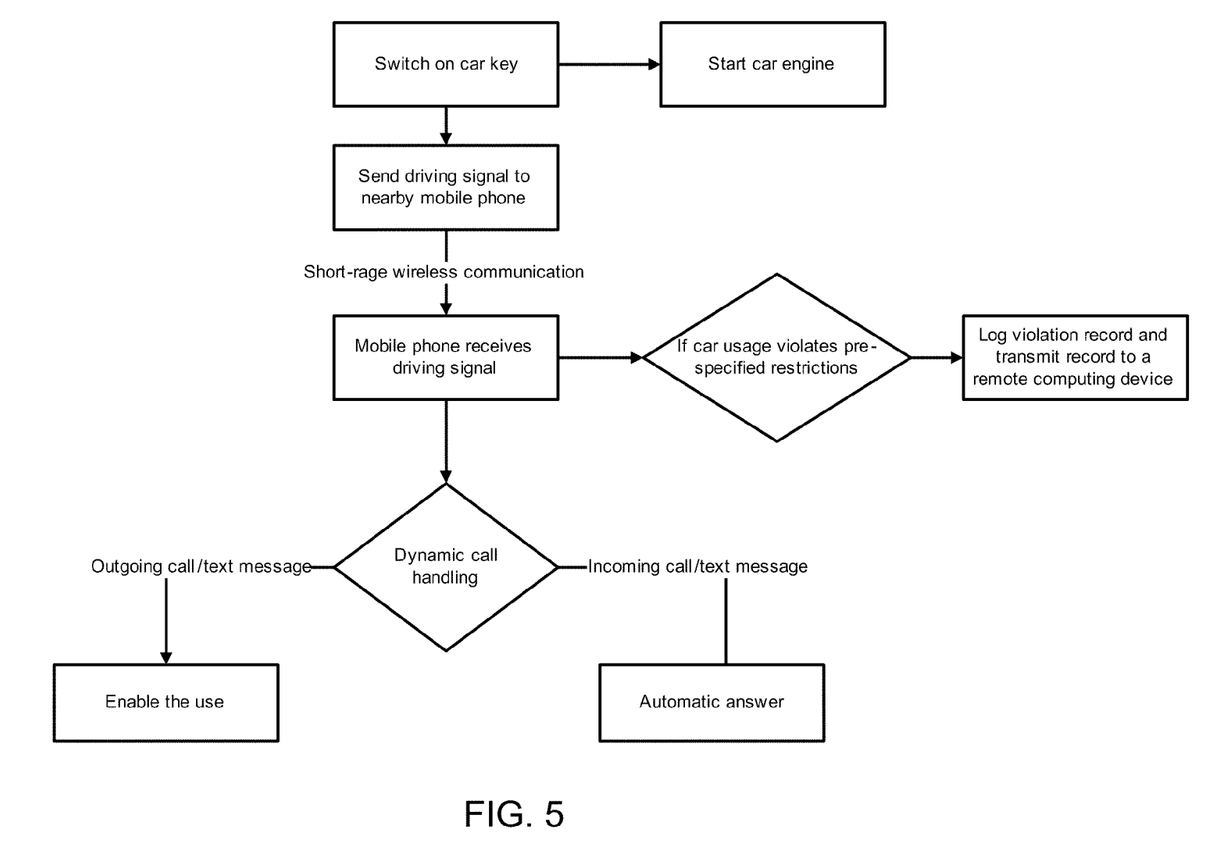
FIG. 5 is a flow chart depicting phone usage handling after the vehicle key is used to start the car engine in accordance with an embodiment of the present invention.

FIG. 5 provides a flow chart for phone usage handling after a key is used to activate a vehicle. A vehicle key is used to start the vehicle engine. A "driving" signal can be sent from the key or vehicle to the mobile computing device associated with the vehicle key. The signal can be communicated wirelessly through a short-range communication protocol, such as Bluetooth or Near Field Communication (NFC). When the mobile computing device receives the "driving" signal, the activity mode of the computing device can be set to a driving mode. In this mode, a dynamic call handling module can allow or disallow users to receive or make a call, text a message or play games. For an incoming call, a "user is driving" message may be sent to the caller.

Continuing with the flow chart of FIG. 5, the cell phone user can be notified by different ringtones for different callers, based on a pre-specified priority of a caller so that a decision can be made if the mobile computing device user needs to pull over to receive the call, or ignore the current call and make a call back after the user arrives at his/her destination.

The dynamic call handling module can also determine if the cell phone is allowed to use the mobile computing device based on use permission data. The use permission data may be stored in the dynamic call handling module, which can operate on the mobile computing device. The use permission data can be based on vehicle speed, time of day, location of the vehicle, and so forth. The use permission data can include data obtained from the vehicle diagnostic detection device. If the vehicle usage violates pre-specified restrictions, a violation record can be logged with safety violation data. The safety violation data can be transmitted to a remote computing device such as a data server or a parent/supervisor's mobile computing device.

The driving data and safety violation data can be further used in a usage based insurance system. The cost of the insurance premium for the user can be reduced or increased based on the safety score of the user. In one embodiment, the premium cost may be adjusted periodically based on the user's safety score during the previous period. For example, the cost may be adjusted monthly, quarterly, semi-annually, or annually. In addition, a commercial vehicle operator can be offered incentives based on the operator's safety score, thereby encouraging the vehicle operator to operate the vehicle within acceptable parameters.

By monitoring and sharing the driving safety performance data between insurance policyholders and insurance companies, additional incentives can be provided in terms of credits or discounts for insurance policyholders and insurance companies to work together to improve driver safety performance. The system can prevent countless motorized vehicle accidents and deaths, thereby enabling a significant amount of money to be saved for the mobile phone owner and insurance company. In addition, commercial companies employing drivers can be assured that their drivers will not be distracted by wireless devices. This can significantly reduce potentially catastrophic accidents for which the company may be responsible.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for controlling use of a mobile computing device in a vehicle, comprising:
   a vehicle diagnostic detection device having a connector configured to connect to an on-board-diagnostic (OBD) port in the vehicle;
   a wireless communication module configured to transmit selected information from the vehicle diagnostic detection device;
   a vehicle key configured to communicate with the vehicle;
   a vehicle key code configured to associate the vehicle key with a particular user of the vehicle; and
   a mobile computing device configured to identify when the vehicle is activated using the vehicle key having the vehicle key code, wherein selected device features of the mobile computing device are controlled when the vehicle is activated using the vehicle key; and
   a vehicle status module configured to operate on the mobile computing device, wherein the mobile computing device receives the selected information transmitted by the wireless communication module and the vehicle status module interprets the selected information and limits functionality of the mobile computing device of the particular user when the selected information communicates that the vehicle is operating outside of selected criteria.

2. A system as in claim 1, wherein the mobile computing device is configured to identify when the vehicle is activated through communication with the vehicle key.

3. A system as in claim 1, wherein the mobile computing device is configured to identify when the vehicle is activated through communication with the vehicle.

4. A system as in claim 1, wherein the vehicle diagnostic detection device is powered through at least one of the OBD port and a 12 VDC port in the vehicle.

5. A system as in claim 1, wherein the vehicle status module is comprised of at least one of software, firmware, and hardware.

6. A system as in claim 1, wherein the vehicle status module is configured to identify when the vehicle is activated using the vehicle key having the vehicle key code and communicate that information to the mobile computing device.

7. A system as in claim 1, wherein the vehicle key code is incorporated in the mobile computing device to enable the mobile computing device to be used as the vehicle key for the vehicle.

8. A system as in claim 1, wherein the vehicle status module is further configured to store information received from the vehicle diagnostic detection device.

9. A system as in claim 8, wherein the information received at the vehicle status module from the vehicle diagnostic detection device is selected from the group consisting of vehicle speed, engine revolutions per minute, engine load, throttle position, and fuel system data.

10. A system as in claim 1, wherein the vehicle status module is further configured to transmit information received from the vehicle diagnostic detection device to a predetermined location.

11. A system as in claim 10, wherein the information is transmitted to at least one of a guardian and an insurance company.

12. A system as in claim 1, wherein the vehicle status module is configured to disable use of selected functions on the mobile computing device when a vehicle speed is greater than a predetermined speed, as received at the OBD port.

13. A system as in claim 1, wherein the vehicle status module is configured to disable use of functions selected from the group consisting of email, texting, gaming, received phone calls, web browsing, and transmitted phone calls.

14. A system as in claim 1, wherein the vehicle status module is configured to wirelessly pair the mobile computing device to the vehicle diagnostic detection device.

15. A system as in claim 14, wherein the vehicle status module is further configured to transmit a warning to a desired location when the pair between the mobile computing device and the vehicle diagnostic detection device has been severed.

16. A system as in claim 1, wherein the vehicle status module is further configured to transmit a vehicle's odometer reading at a beginning and an ending of each vehicle operation to enable a person receiving data from the vehicle status module to determine whether the vehicle was operated without the vehicle status module in operation on the mobile computing device.

17. A system as in claim 1, wherein the vehicle diagnostic detection device is further configured to record a vehicle's odometer reading at a beginning and an ending of each vehicle operation.

18. A system as in claim 17, wherein the vehicle diagnostic detection device is further configured to transmit a usage violation warning to the vehicle status module if a vehicle's beginning odometer reading is not substantially the same as a previous ending odometer reading.

19. A system as in claim 18, wherein the vehicle status module is configured to transmit the usage violation warning to at least one of a guardian and an insurance company.

20. A method for controlling use of a mobile computing device in a vehicle, comprising:
 monitoring a vehicle-key system comprising a vehicle and a vehicle key having a particular code to determine when the vehicle has been activated using the vehicle key;
 identifying an operational state of the vehicle based on information received from a vehicle diagnostic detection device configured to connect to an on-board-diagnostic (OBD) port in the vehicle;
 communicating the operational state of the vehicle to the mobile computing device; and
 controlling use of selected device features on the mobile computing device based on the particular code of the vehicle key when the operational state of the vehicle indicates that the vehicle is outside of selected parameters.

* * * * *